US008697013B2

(12) United States Patent
Harris et al.

(10) Patent No.: US 8,697,013 B2
(45) Date of Patent: Apr. 15, 2014

(54) DEVICES FOR RETAINING A NONPOROUS SUBSTRATE AND METHODS

(75) Inventors: J. Keith Harris, Midland, MI (US); David A. Hayes, Midland, MI (US); Linda A. Moore, Midland, MI (US); Jessica L. Bell, Ann Arbor, MI (US)

(73) Assignee: Dow Global Technologies LLC, Midland, MI (US)

( * ) Notice: Subject to any disclaimer, the term of this patent is extended or adjusted under 35 U.S.C. 154(b) by 823 days.

(21) Appl. No.: 12/573,914

(22) Filed: Oct. 6, 2009

(65) Prior Publication Data

US 2010/0083778 A1 Apr. 8, 2010

Related U.S. Application Data

(60) Provisional application No. 61/102,909, filed on Oct. 6, 2008.

(51) Int. Cl.
*G01N 15/06* (2006.01)

(52) U.S. Cl.
USPC .......... 422/561; 422/68.1; 422/550; 422/551; 422/552; 422/553; 422/554; 422/560; 422/565

(58) Field of Classification Search
USPC .......... 422/68.1, 50, 502, 503, 504, 550, 551, 422/552, 553, 554, 560, 561, 565
See application file for complete search history.

(56) References Cited

U.S. PATENT DOCUMENTS

| | | | | |
|---|---|---|---|---|
| 5,799,953 | A | 9/1998 | Henderson | |
| 6,274,088 | B1 | 8/2001 | Burbaum et al. | |
| 6,755,384 | B2 | 6/2004 | Gorfain | |
| 8,287,822 | B2 * | 10/2012 | Grudzien et al. | 422/552 |
| 2005/0047971 | A1 * | 3/2005 | Clements et al. | 422/102 |

* cited by examiner

*Primary Examiner* — Brian J Sines

(57) ABSTRACT

Described are devices for retaining a nonporous substrate, as well as methods for their use, the devices comprising a housing for receiving the nonporous substrate, a removable well insert attached to the housing and adjacently coplanar to the substrate, the well insert having at least one opening that, together with the substrate, defines a well, and means for exerting a force against the substrate such that the substrate engages the well insert with sufficient force to attain a fluid-tight seal in the well.

13 Claims, 3 Drawing Sheets

DEVICES FOR RETAINING A NONPOROUS SUBSTRATE AND METHODS

CROSS REFERENCE TO RELATED APPLICATIONS

This application claims the benefit of U.S. Provisional Application No. 61/102,909, filed on Oct. 6, 2008.

BACKGROUND

A number of research and testing procedures require the use of an array in which multiple formulations are screened or evaluated simultaneously. For example, formulations are evaluated for their impact on removing a coating or soil deposited on nonporous substrates like glass, plastic, ceramic, stone, or metal. The primary consideration is that the formulation must not leak or wick out of the test area, and particularly not into the adjacent test area. However, formation of individual wells in the substrate itself is not desirable, because it would complicate manufacture and prevent uniform application of the soil or coating to the substrate.

Thus there is a need for a device and method for testing the same or different compositions in parallel with a variety of nonporous substrates.

SUMMARY

In one embodiment, the present invention provides devices for retaining a nonporous substrate, comprising a housing for receiving the nonporous substrate, a removable well insert attached to the housing and adjacently coplanar to the substrate, the well insert having at least one opening that, together with the substrate, defines a well, and means for exerting a force against the substrate such that the substrate engages the well insert with sufficient force to attain a fluid-tight seal in the well.

The drawings are understood to be for illustrative purposes only. As will be appreciated, elements shown in the embodiments herein can be added, exchanged and/or eliminated. In addition, the proportion and the relative scale of the elements provided in the figures are intended to illustrate certain features, and should not be taken in a limiting sense.

DETAILED DESCRIPTION

In one embodiment, the present invention provides devices for retaining a nonporous substrate, comprising a housing for receiving the nonporous substrate, a removable well insert attached to the housing and adjacently coplanar to the substrate, the well insert having at least one opening that, together with the substrate, defines a well, and means for exerting a force against the substrate such that the substrate engages the well insert with sufficient force to attain a fluid-tight seal in the well.

Figure 1:
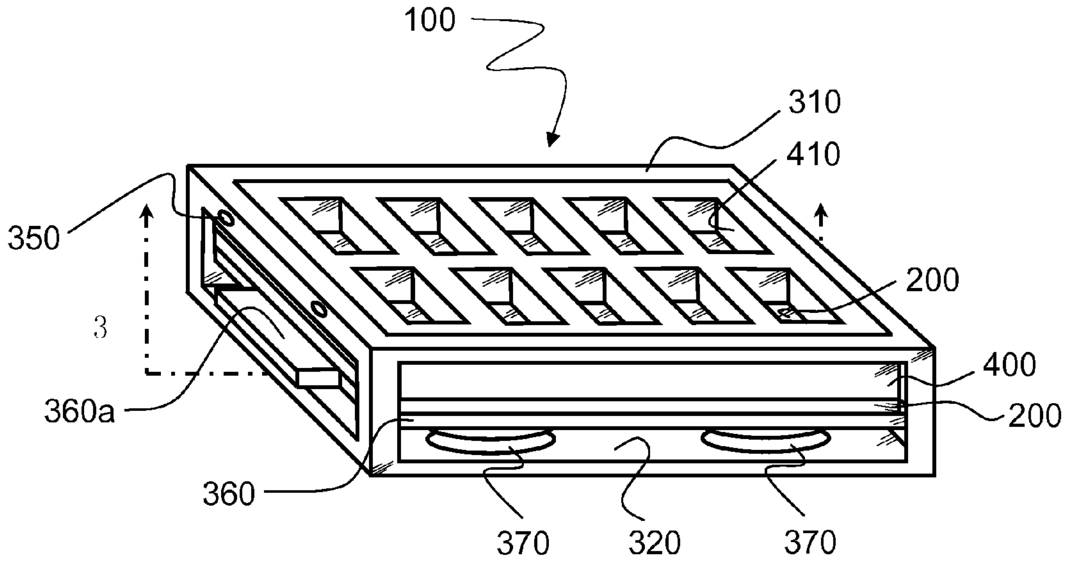
FIG. 1 is device according to one embodiment of the present invention.
Figure 3:
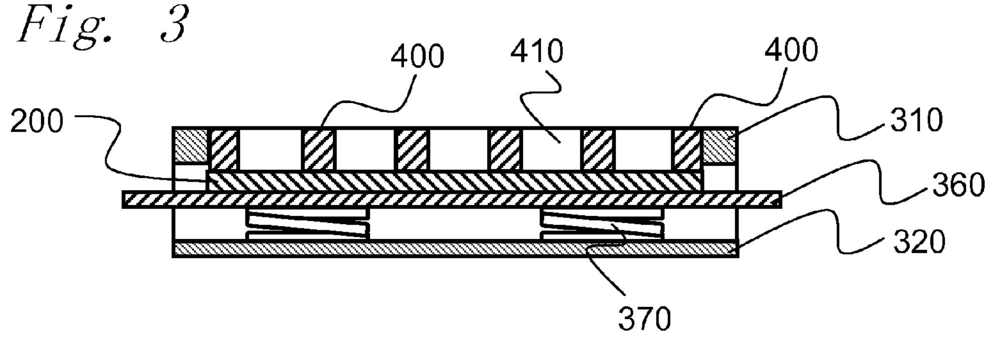
FIG. 3 is a sectional view of the device of FIG. 1.
Figure 2:
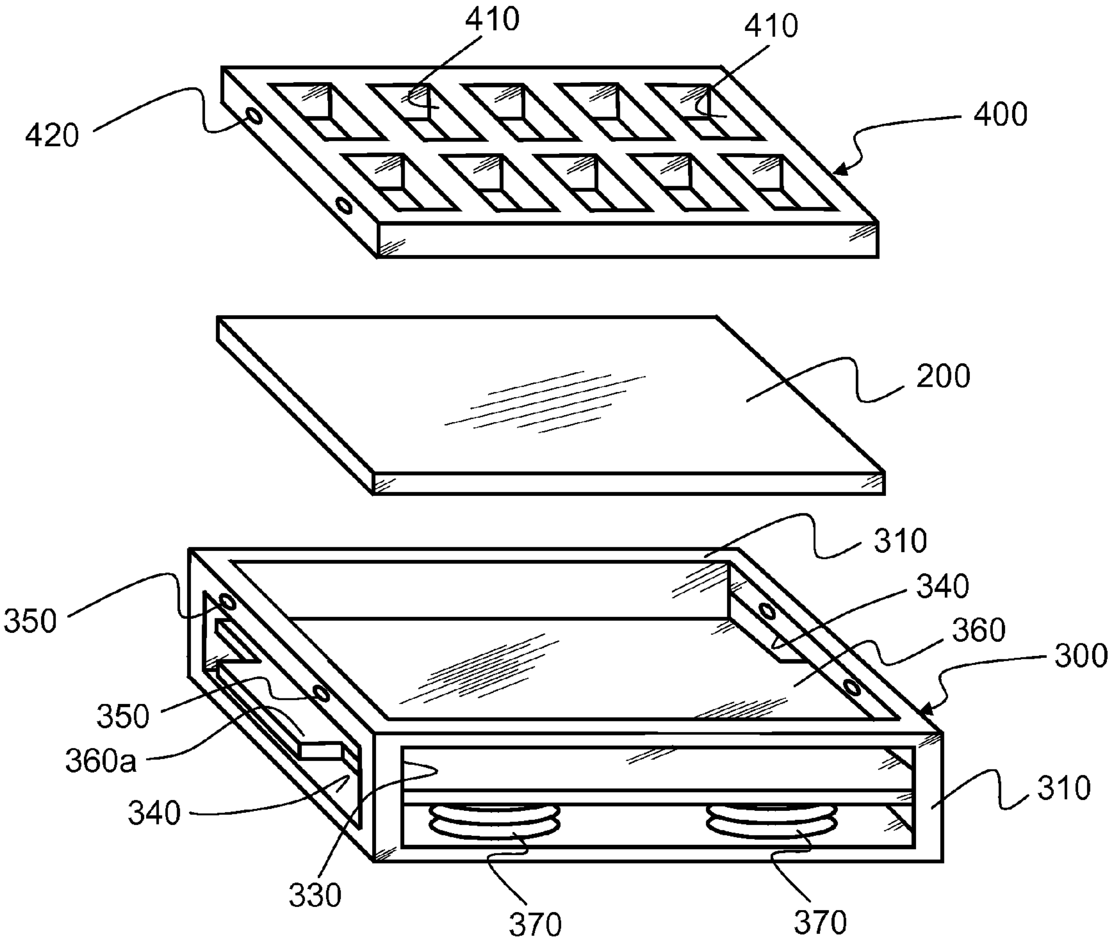
FIG. 2 is an exploded view of the device.
Figure 4A:
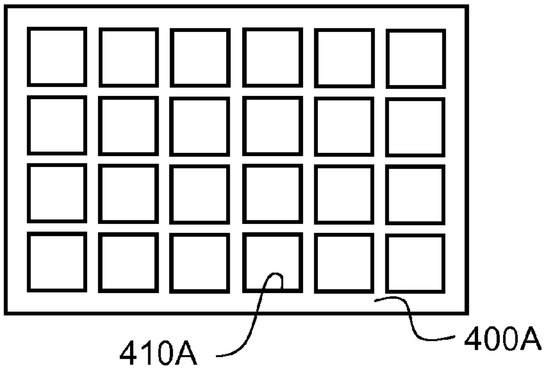
FIGS. 4A-4F are plan views of alternative embodiments of the well insert.
Figure 4B:
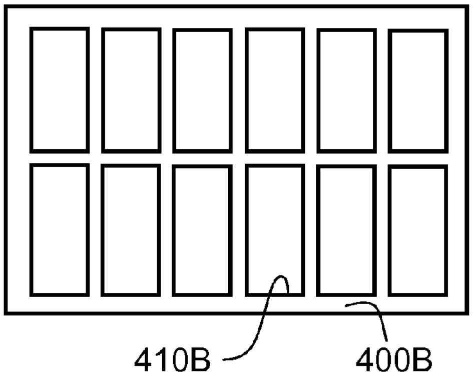
Figure 4C:
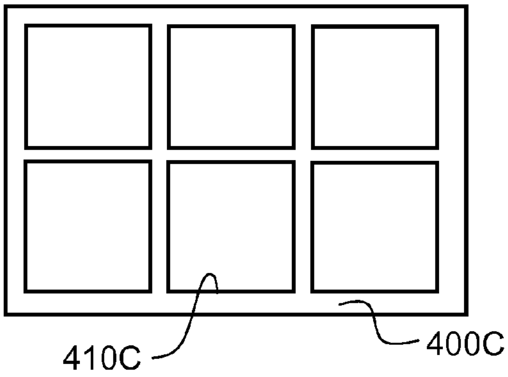
Figure 4D:
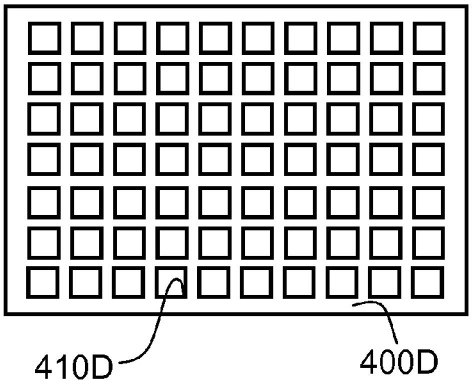
Figure 4E:
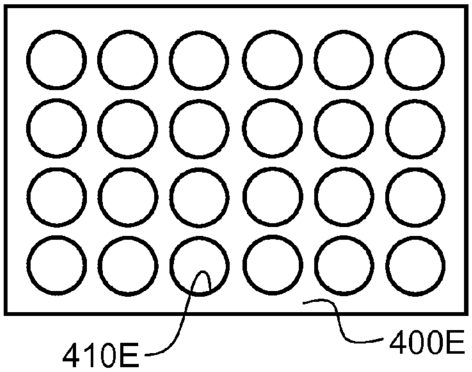
Figure 4F:
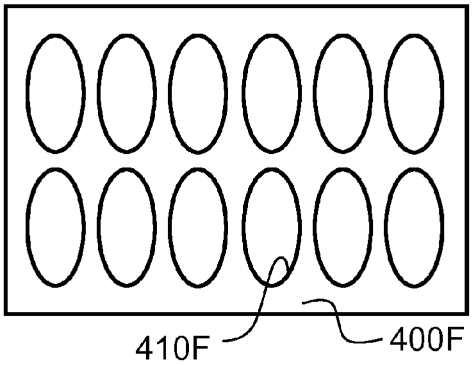

Referring now to FIGS. 1-3, the present invention relates to a device 100 for retaining a nonporous substrate 200. The term "nonporous" refers to the permeability of the substrate and is best illustrated by listing materials with similar permeability characteristics, e.g., in one embodiment, nonporous substrate 200 is glass, plastic, ceramic, stone, or metal. It is understood that an otherwise semi-porous substrate can be pre-coated with a non-porous layer, for example, paint on wood, and thus be a nonporous substrate according to the present invention. Preferably, the substrate 200 is a substrate to be used for testing in conjunction with a fluid.

In the art, there is a need to test the effects of fluid compositions on substrates. For example, the substrate may be uniformly soiled and then tested with a variety of fluid cleaning compositions to evaluate their efficacy. Alternatively, the substrate may be coated with a coating or paint composition that needs to be evaluated, and then tested with a variety of fluid compositions simulating harsh environmental conditions (for example, salt, acid, corrosive), optionally scratched and then tested.

The device 100 has a housing, generally given the reference 300 (FIG. 2), for receiving the nonporous substrate 200. The housing 300 has a plurality of walls 310, and a base 320, that define its shape. The walls 310 have a plurality of openings, a front opening 330, and a pair of side openings 340. It is understood that "front" and "side" are in reference to device as illustrated in the accompanying figures, and not intended to be limiting.

In one embodiment, a series of ports 350 are optionally disposed in at least two of the walls 310 for receiving detents, pins, or screws (not depicted) for reasons to be described.

A plate 360 is moveably disposed in the housing 300 for exerting a force against the substrate 200. As depicted, the plate 360 is positioned coplanar to the substrate 200. It is understood that shims (not depicted) may be introduced between the substrate and plate if desired. The plate 360 has a pair of wings 360*a*, which protrude through the wall openings 340.

A plurality of springs 370 are disposed in compression between the plate 360 and the base 320, thereby exerting a force biasing the plate away from the base. The wings 360*a* optionally engage the walls 310 to keep the springs partially compressed. The 370 springs are selected to produce the desired force, as will be described. The strength of the force can be readily determined by those skilled in the art. In one embodiment, only one spring is provided, in other embodiments, at least four springs are provided. It can be readily appreciated that increasing the number of springs can better disperse the force over the plate 360.

It is understood that also contemplated is a system (not depicted) using retracting springs that pull the plate relatively upward versus the illustrated compressive springs 370 that push the plate 360. Alternatively, the plate and springs may be replaced with a pneumatic bladder (not depicted), a hydraulic system (not depicted), a ratchet mechanism (not depicted), or a screw mechanism (not depicted) as a means for exerting a force against the substrate 200. The important consideration is that the means exert a constant and self-contained force against the substrate.

A removable well insert 400 is attached to the housing via the ports 350. Alternatively, the well insert could be inserted through the housing front opening 330 and retained with a step (not depicted) when under force. The well insert may be formed from metal, ceramic, polyethylene terephthalate (PET), TEFLON, Polyaryletheretherketone polymer (PEEK), Polyoxymethylene (DELRIN), polypropylene, polyvinyl chloride (PVC), epoxy or any durable, non-reactive material. As shown, the well insert 400 is disposed adjacently coplanar to the substrate. A plurality of openings 410 is disposed in the well insert. When assembled, the well insert openings 410 cooperate with the surface of the substrate 200 to define a well (not numbered). It is a feature of the present invention that the means for exerting a force against the substrate causes the substrate to engage the well insert with sufficient force to attain a fluid-tight seal in the well. In one embodiment, the means for exerting a force against the substrate maintains at least 25 psi, preferably at least 35 psi, preferably at least 45 psi, preferably at least 50 psi, preferably at least 75 psi, and more preferably at least 100 psi. In one embodiment, the means for exerting a force against the substrate maintains less than 200 psi.

Although ten rectangular openings 410 are depicted in FIGS. 1 and 2, it is understood that the desirability of the number and size of the openings may vary with the substrate, fluid composition, and properties to be tested. In one embodiment, the well insert has at least 4, preferably at least 6, preferably at least 12, more preferably at least 24 openings. Turning to FIGS. 4A-4F, a few alternative embodiments of the well insert, numbered 400A-400F, respectively, are illustrated, having well insert openings 410A-410F respectively.

Returning now to FIGS. 1-3, the volume of the well is at least 10 μL, at least 10 μL, preferably at least 100 μL, preferably at least 250 μL, preferably at least 300 μL, preferably at least 500 μL, more preferably at least 750 μL. In one embodiment, the volume of the well is less than about 5 mL.

In one embodiment, the device 100 may further comprise a cover (not depicted) for covering the well insert 400, thus preventing the contents of each well from spilling or evaporating. This is particularly desirable if testing conditions call for agitation (such as with a linear reciprocating mechanical shaker) or heating above ambient temperatures.

Figure 5:
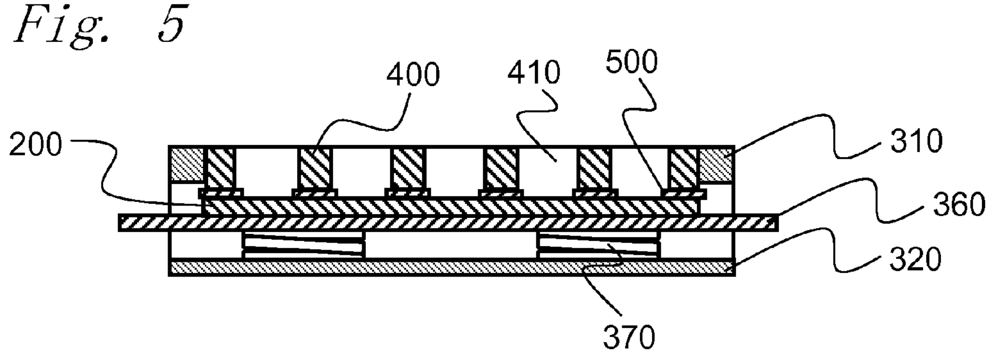
FIG. 5 is a sectional view of an alternative embodiment of the device.

Turning now to FIG. 5, in one embodiment, a device similar in all respects to the previously described device 100 is provided, and given the same reference numerals, except that this device further comprises a gasket 500 disposed between the well insert and the substrate. The gasket 500 may be of any compressible material that prevents fluid test compositions from leaving their respective wells. The gasket could be replaced with O-rings.

The previously described devices enjoy certain benefits. For example, in one embodiment, the devices find use in a method of uniformly testing among generally planar nonporous substrates of varying thicknesses or surface irregularity. This is possible because the wells are formed on the opposite side from which the force is applied.

In operation, and referring to FIGS. 1 and 2, the well insert 400 is attached to the housing 300. The springs 370 are compressed, such as by applying a sufficient downward force on the plate wings 360*a*.

A soiled or coated substrate 200 is introduced through the housing front opening 330 and then the springs 370 are allowed to move the plate 360, thereby exerting a force against the substrate, causing the substrate to engage the well insert 400 with sufficient force to attain a fluid-tight seal in the wells. Alternatively, a clean substrate could be introduced through the housing front opening and thereafter soiled or coated.

At least one fluid is placed in the wells. Examples of fluids include cleaning compositions, dyes, wood sealers, coating compositions, masonry sealers, corrosives, and the like. Alternatively, different concentrations of the same active in a fluid may be tested. The fluids may be gas, liquid, gel, or foam, or they may be solid or granular compounds designed to dissolve upon contact with water. The device 100 may be optionally placed into an oven or heating block to heat or warm the fluid. It is understood that single and multiple cycles (clean, rinse, clean, rinse, etc.) for a given test are contemplated.

After testing, the substrate and/or the fluid may be screened visually and/or by spectral techniques for qualitative or quantitative analysis.

It is understood that the present invention is not limited to the embodiments specifically disclosed and exemplified herein. Various modifications of the invention will be apparent to those skilled in the art. Such changes and modifications may be made without departing from the scope of the appended claims.

Moreover, each recited range includes all combinations and sub combinations of ranges, as well as specific numerals contained therein. Additionally, the disclosures of each patent, patent application, and publication cited or described in this document are hereby incorporated herein by reference, in their entireties.

The invention claimed is:

1. A device for retaining a nonporous substrate, comprising:

a housing for receiving the nonporous substrate;

a removable well insert attached to the housing and adjacently coplanar to the substrate, the well insert having at least one opening that, together with the substrate, defines a well; and means for exerting a force against the substrate such that the substrate engages the well insert with sufficient force to attain a fluid-tight seal in the well which means is selected from a moveable plate disposed within the housing and coplanar to the substrate, a pneumatic bladder, a hydraulic system, a ratchet mechanism and a screw mechanism.

2. The device of claim 1, wherein the nonporous substrate is glass, plastic, ceramic, stone, or metal.

3. The device of claim 1, wherein the well insert has at least 4 openings.

4. The device of claim 1, wherein the volume of the well is at least 10 μL.

5. The device of claim 1, wherein the means for exerting a force against the substrate is a moveable plate disposed within the housing and coplanar to the substrate.

6. The device of claim 5, wherein the plate is attached to at least one spring.

7. The device of claim 5, wherein the plate is attached to at least four springs.

8. The device of claim 1, wherein the means for exerting a force against the substrate is a pneumatic bladder or a hydraulic system.

9. The device of claim 1, wherein the means for exerting a force against the substrate is a ratchet mechanism.

10. The device of claim 1, wherein the means for exerting a force against the substrate is a screw mechanism.

11. The device of claim 1, wherein the means for exerting a force against the substrate maintains at least 25 psi.

12. The device of claim 1, further comprising a cover for covering the well insert.

13. The device of claim 1, further comprising a gasket disposed between the well insert and the substrate.

* * * * *